US012744055B2

(12) United States Patent
Knigge et al.

(10) Patent No.: US 12,744,055 B2
(45) Date of Patent: Sep. 22, 2026

(54) DATA STORAGE DEVICE WITH RECORDING HEAD FAILURE PREDICTION AND MITIGATION

(71) Applicant: Western Digital Technologies, Inc., San Jose, CA (US)

(72) Inventors: Bernhard E. Knigge, San Jose, CA (US); Bernd Lamberts, San Jose, CA (US); Tae Sik Kang, San Jose, CA (US); Christopher D. Keener, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/071,928

(22) Filed: Mar. 6, 2025

(65) Prior Publication Data

US 2026/0268929 A1 Sep. 10, 2026

(51) Int. Cl.
*G11B 5/40* (2006.01)
*G11B 5/00* (2006.01)

(52) U.S. Cl.
CPC ........ *G11B 5/40* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,249,890 | B1 * | 6/2001 | Ukani | G06F 11/008 714/E11.02 |
| 8,908,483 | B1 * | 12/2014 | Ren | G11B 5/6088 369/13.13 |
| 9,117,474 | B1 * | 8/2015 | Contreras | G11B 5/6005 |
| 9,442,859 | B1 * | 9/2016 | Bolt | G06F 12/0893 |
| 9,601,140 | B1 | 3/2017 | Rajauria | |
| 11,783,854 | B1 | 10/2023 | Rajauria et al. | |
| 2004/0032687 | A1 * | 2/2004 | Ng | G11B 5/58 360/75 |
| 2009/0128944 | A1 * | 5/2009 | Jang | G11B 5/6064 360/59 |
| 2011/0299367 | A1 * | 12/2011 | Naniwa | G11B 5/40 |
| 2013/0107680 | A1 * | 5/2013 | Contreras | G11B 5/40 369/13.32 |
| 2015/0199987 | A1 * | 7/2015 | Canchi | G11B 5/607 369/13.11 |
| 2018/0240487 | A1 * | 8/2018 | Niwa | G11B 5/7369 |
| 2022/0301589 | A1 * | 9/2022 | Obuchi | G11B 20/1816 |
| 2024/0005957 | A1 * | 1/2024 | Contreras | G11B 27/36 |
| 2024/0304214 | A1 * | 9/2024 | Lamberts | G11B 5/012 |
| 2025/0239277 | A1 * | 7/2025 | Isowaki | G11B 27/36 |

* cited by examiner

*Primary Examiner* — Peter Vincent Agustin
(74) *Attorney, Agent, or Firm* — NOD Law PC

(57) ABSTRACT

A method for predicting and mitigating recording head failure in a data storage device. Thermal condition parameters of recording heads are monitored during operation. The thermal condition parameters are analyzed to identify conditions indicating a likelihood of failure of the recording heads. The analysis is performed by a simple model that compares the thermal condition parameters to predefined thresholds, or a machine learning model trained to predict time-to-failure of the recording heads based on the thermal condition parameters. Corrective actions are implemented to mitigate the likelihood of failure and extend the operational lifetime of the recording heads.

20 Claims, 6 Drawing Sheets

DATA STORAGE DEVICE WITH RECORDING HEAD FAILURE PREDICTION AND MITIGATION

BACKGROUND

Data storage devices such as disk drives comprise a magnetic storage medium such as a disk and a recording (read/write) head connected to a distal end of an actuator arm that is rotated about a pivot by an actuator such as a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The actuator typically rotates a number of actuator arms about a pivot in order to simultaneously position a number of recording heads over respective disk surfaces based on the servo data recorded on each disk surface.

FIG. 1 is a conceptual diagram of a conventional disk format 2 comprising a number of servo tracks 4 defined by servo sectors $\mathbf{6}_0 \ldots \mathbf{6}_N$ recorded around the circumference of each servo track 4. Each servo sector $\mathbf{6}_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $\mathbf{6}_i$ further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to the actuator to actuate the recording head radially over the disk in a direction that reduces the PES.

In order to achieve higher areal densities, recording heads are sometimes configured for heat-assisted magnetic recording (HAMR). HAMR facilitates higher data densities by temporarily heating the recording medium during the write process. A laser integrated into the write head heats a tiny spot on the disk surface to lower its magnetic coercivity, making it easier for the write head to change the magnetic orientation of that specific area. Once the medium cools down, it retains the written data in a stable and permanent state. The HAMR heating process allows the use of media with smaller and more thermally stable magnetic grains, which in turns allows for higher data storage densities compared to traditional recording methods. However, while heating the recording medium enables higher data densities, the intense, localized heating can introduce heat-related issues in the recording head that can impact performance and shorten the head's operational lifetime. Early prediction of head failure and timely mitigation are therefore critical to maintaining the reliability of and extending the lifespan of data storage devices configured for HAMR.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Some aspects of this disclosure are directed to a method for predicting and mitigating recording head failure in a data storage device configured for heat-assisted magnetic recording (HAMR). The method comprises monitoring thermal condition parameters of one or more recording heads, wherein the thermal condition parameters include one or more of absolute embedded contact sensor (ECS) resistance, absolute near field temperature sensor (NTS) resistance, change rate of ECS resistance (dECS), and change rate of NTS resistance (dNTS); comparing the monitored thermal condition parameters to predefined thresholds to detect deviations indicating a likelihood of failure of the one or more recording heads; and implementing one or more corrective actions to reduce thermal stress on the one or more recording heads and to mitigate the likelihood of failure of the one or more recording heads.

In some implementations, the one or more corrective actions comprises applying an interface voltage control (IVC) bias voltage to the one or more recording heads. In some examples, the IVC bias voltage is in a range of −50 mV to −900 mV.

In some implementations, the one or more corrective actions comprises reducing a workload applied to the one or more recording heads.

In some implementations, the one or more corrective actions comprises logical depopulation of the one or more recording heads.

Other aspects of this disclosure are directed to a method for predicting and mitigating recording head failure in a data storage device configured for heat-assisted magnetic recording (HAMR). The method comprises monitoring multiple thermal condition parameters of one or more recording heads during operation; analyzing the thermal condition parameters using a machine learning model; generating survival probability scores for the one or more recording heads; and implementing one or more corrective actions based on the generated survival probability scores to mitigate a likelihood of failure and extend an operational lifetime of the one or more recording heads.

In some implementations, the thermal condition parameters comprise one or more of absolute embedded contact sensor (ECS) resistance, absolute near field temperature sensor (NTS) resistance, change rate of ECS resistance (dECS), change rate of NTS resistance (dNTS), thermal gradient, write erase width (WeW), and peak media temperature.

In some implementations, the machine learning model is a graph neural network (GNN) model.

In some implementations, the machine learning model further comprises an adversarial variational auto-encoder (GVAE) configured to identify latent interactions between the monitored thermal condition parameters; and a graph isomorphic model configured to predict lifetime expectation values for the one or more recording heads based on the latent interactions and survival statistics.

In some implementations, the method further comprises streaming real-time operational data to the machine learning model to update the model's predictions and to refine operational policies to ensure that the one or more corrective actions adapt dynamically to evolving operating conditions.

In some implementations, the evolving operating conditions comprise temperature fluctuations and operational vibrations.

In some implementations, the machine learning model is deployed during manufacturing or final testing to identify early lifetime failure heads and lifetime limited heads.

In some implementations, the one or more corrective actions comprise head replacement, logical depopulation of the failing head, adjustments to the IVC bias voltage, reductions in laser current to decrease thermal stress, reformatting tracks per inch (TPI) and bits per inch (BPI) to adjust recording density, and workload reduction.

In some implementations, the method further comprises training the machine learning model offline using historical datasets; and simplifying the trained machine learning model into a reduced form and uploading the reduced form model to firmware of the data storage device.

In some implementations, the machine learning model analyzes diagnostic logs generated by HDD firmware to capture real-time thermal condition parameters.

In some implementations, the machine learning model uses a Bayesian learning approach implemented as actor-critic reinforcement learning.

In some implementations, the survival probability scores are generated for multiple time horizons.

In some implementations, the machine learning model ingests data from multiple sources during real-time operation, the multiple sources comprising component parametric data, workload data, and environmental data.

In some implementations, the machine learning model comprises a policy optimization component that recommends or implements operational adjustments to reduce stress on weaker heads and extend their operational lifetime.

Further aspects of this disclosure are directed to a method for predicting and mitigating recording head failure in a data storage device. The method comprises monitoring thermal condition parameters of one or more recording heads during operation; analyzing the thermal condition parameters to identify conditions indicating a likelihood of failure of the one or more recording heads, wherein the analyzing is performed by at least one of a simple model that compares the thermal condition parameters to predefined thresholds; and a machine learning model trained to predict time-to-failure of the one or more recording heads based on the thermal condition parameters; and implementing one or more corrective actions to mitigate the likelihood of failure and extend an operational lifetime of the one or more recording heads.

Other aspects of this disclosure are directed to a method for predicting recording head failure in a data storage device configured for heat-assisted magnetic recording (HAMR). The method comprises monitoring thermal condition metrics of a recording head comprising embedded contact sensor (ECS) resistance, near field temperature sensor (NTS) resistance, changes in ECS resistance (dECS), and changes in NTS resistance (dNTS); comparing ECS, NTS, dECS, and dNTS to predefined thresholds; and predicting premature failure of the recording head when any of ECS, NTS, dECS, and dNTS exceed the predefined thresholds.

Further aspects of this disclosure are directed to . . . .

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
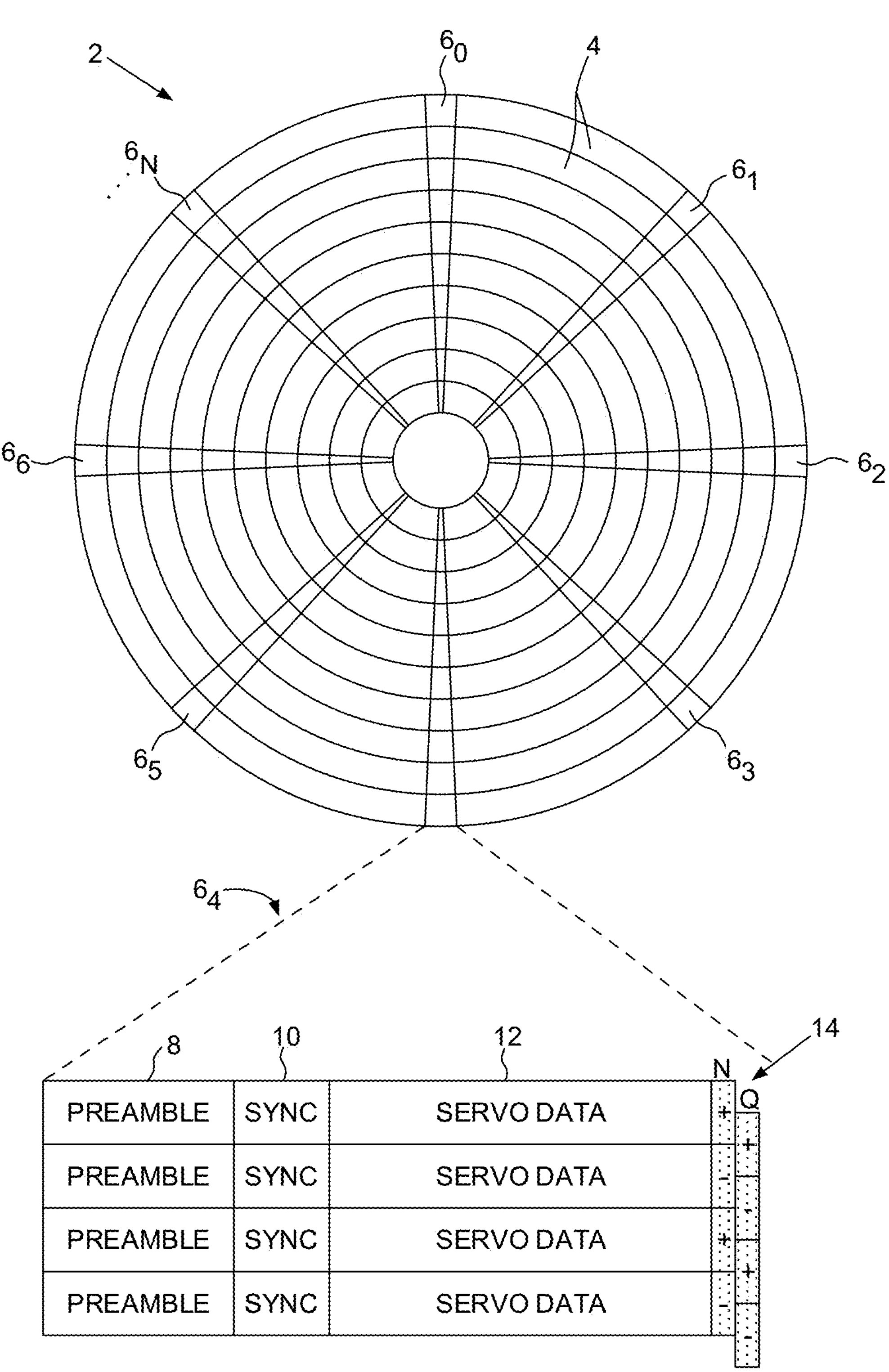
FIG. 1 is a conceptual diagram of a conventional disk format, in accordance with aspects of this disclosure.
Figures 2A, 2B, 2C:
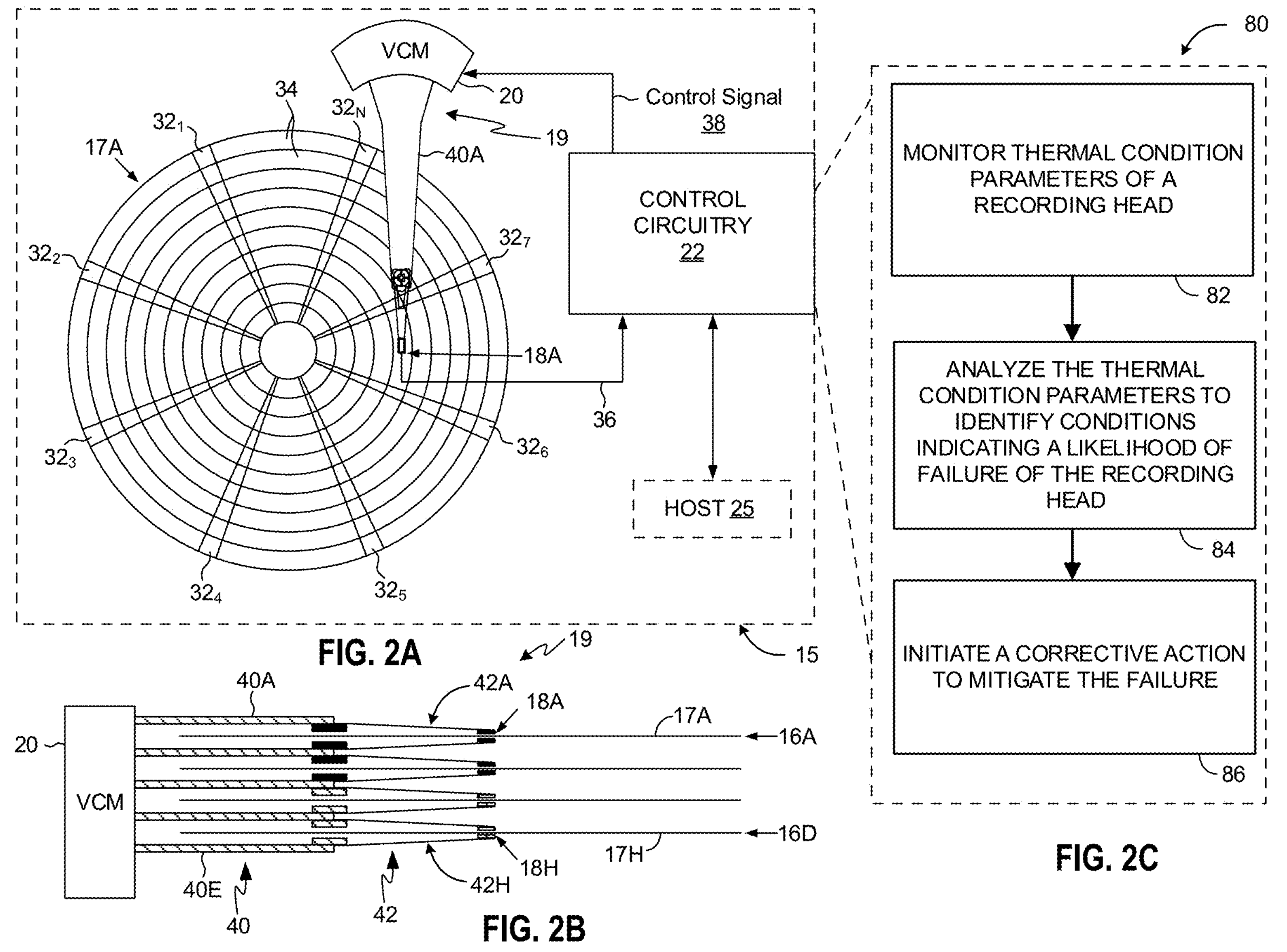
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram illustrating a method for predicting recording head failure in a data storage device configured for heat-assisted magnetic recording (HAMR), in accordance with aspects of this disclosure.

FIGS. 2A and 2B are conceptual top and side views of a data storage device in the form of hard disk drive (HDD) 15, in accordance with aspects of this disclosure. HDD 15 comprises recording heads 18 (e.g., recording heads 18A . . . 18H) that are actuated and positioned over surfaces 17

(e.g., surfaces 17A . . . 17H) of magnetic storage media 16 (e.g., disks 16A . . . 16D) by actuator assembly 19. Recording heads 18 comprise write and read elements configured for writing and reading data and control features to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured in a slider at a distal end of an actuator arm 40 via a suspension 42 (suspensions 42A . . . 42H). Each actuator arm 40 is configured to suspend a head 18 in close proximity over a corresponding disk surface 17. For example, head 18A is suspended by topmost actuator arm 40A via suspension 42*a* over topmost disk surface 17A, and head 18H is suspended by lowest actuator arm 40H via suspension 42H over lowest disk surface 17H. FIGS. 2A-B are presented for exemplary purposes only; a wide variety of other numbers of disks, disk surfaces, primary actuators, actuator assemblies, suspensions, and heads are contemplated and may be used.

Control circuitry 22 may be implemented in one or more processing devices and performs or executes various methods, processes, functions, and tasks to manage and control operation of HDD 15, and in particular to manage and control operation of recording heads 18. For example, positioning data from servo sectors or wedges $\mathbf{32}_1$, . . . $\mathbf{32}_N$ on disk surfaces 17 included in read signals 36 from recording heads 18 allows control circuitry 22 to determine the position of each head 18 relative to disk surface 17. Based on a position error signal (PES) that represents the difference between the head's actual position and the target track, control circuitry 22 generates control signals 38 that are sent to actuator 20, which adjusts the alignment of heads 18 to maintain accurate tracking over tracks 34.

FIG. 2C is a flow diagram depicting a method 80 performed by control circuitry 22 for predicting and mitigating recording head failure in a data storage device configured for heat-assisted magnetic recording (HAMR), in accordance with aspects of this disclosure. In step 82 of method 80, control circuitry 22 monitors thermal condition parameters of a recording head. In step 84, control circuitry 22 analyzes the monitored thermal condition parameters to identify conditions indicating a likelihood of failure of the recording head. In one approach, the analysis of step 84 comprises comparing the monitored thermal condition parameters to predefined thresholds to detect deviations indicative of recording head failure. In another approach, the analysis of step 84 comprises processing the monitored thermal condition parameters using a machine learning model to identify patterns associated with recording head failure. In step 86, control circuitry 22 initiates a corrective action based on the identified likelihood of failure.

Figure 3:
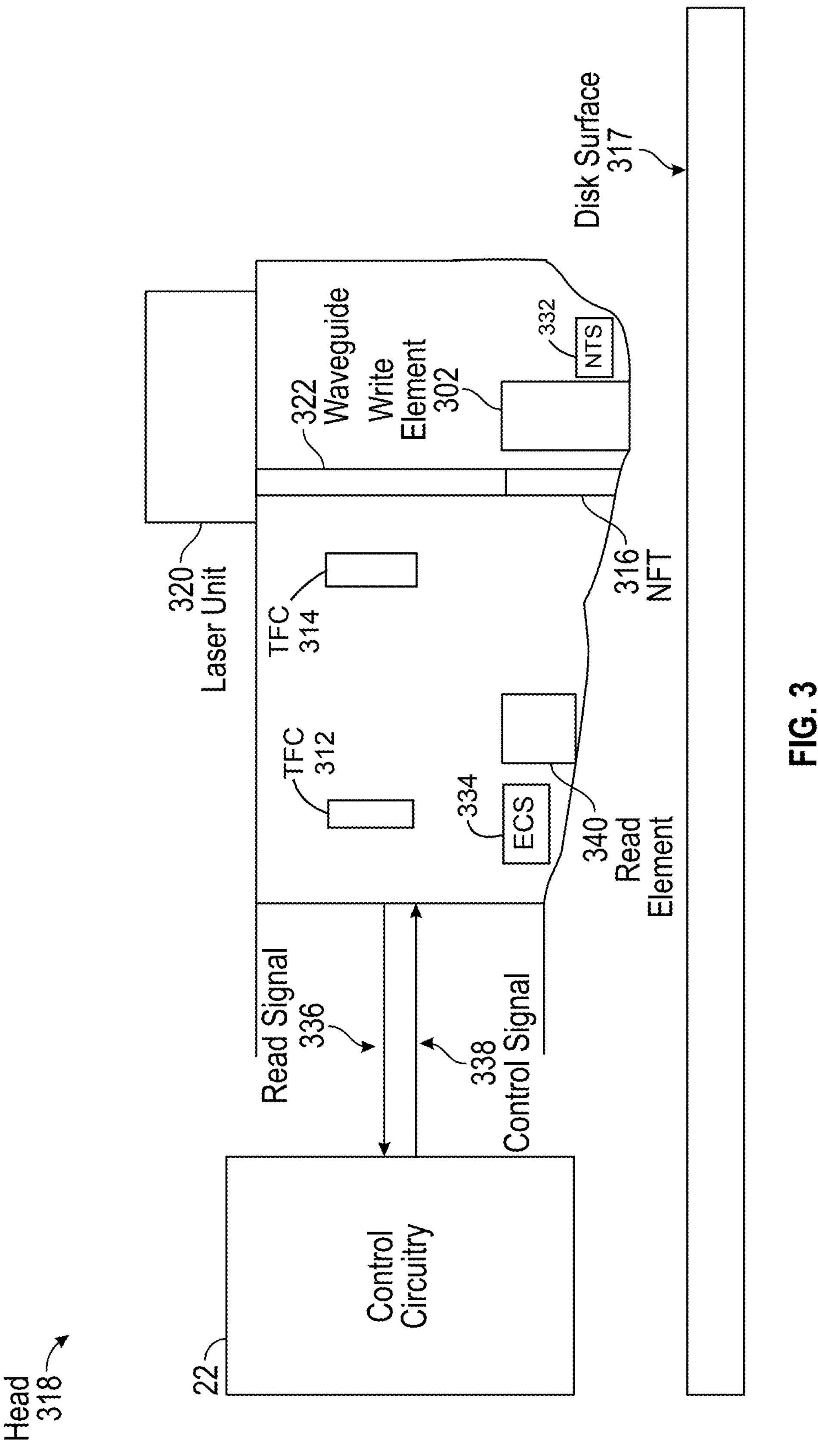
FIG. 3 is a conceptual sectional diagram of a recording head of a data storage device suspended above and operating proximate to a disk surface, in accordance with aspects of this disclosure.

FIG. 3 is a conceptual sectional diagram of a recording head 318 of a data storage device suspended above and operating proximate to a disk surface 317, in accordance with aspects of this disclosure. Head 318 and disk surface 317 are examples of heads 18 and disk surfaces 17 of FIGS. 2A and 2B. Control circuitry 22 outputs control signals 338 to recording head 318 and receives read signals 336 (including data signals, control signals, and thermal condition metrics) from head 318. It should be noted that FIG. 3 is a conceptual diagram and not an engineering schematic, and that the elements depicted in FIG. 3 may be configured in orientations and arrangements other than the example configuration that is shown in FIG. 3.

Recording head 318 comprises write element 302 and read element 304. Control circuitry 22 causes data to be written to disk surface 317 by modulating a write current in an inductive write coil in write element 302 to create a magnetic field strong enough to magnetize a bit of magnetic material in disk surface 317 in one direction, representing a binary one, or in an opposite direction, representing a binary zero. Read element 304, typically a magneto resistive (MR) sensor, detects the direction of magnetization in the magnetized bits of disk surface 317 through changes in resistance in the MR sensor. Resistance changes in the MR sensor correspond to the binary one and zero states of the magnetized bits and are converted by control circuitry 22 into readable digital data. Recording head 318 may also comprise thermal fly height (TFC) elements such as TFC heaters 312 and 314 that generate localized heat to expand or bulge head 318 slightly towards disk surface 317, enabling precise control over fly height.

Recording head 318 further comprises laser unit 320, which in some examples is a semiconductor laser diode designed to emit light at a wavelength suitable for heating. Waveguide 322 is configured to direct light emitted by laser unit 320 to near-field transducer (NFT) 316, which in some examples is a metallic structure situated near write element 302 that is shaped to concentrate the laser light into a tiny (nanoscale) spot on disk surface 317 where the data needs to be written. This localized heating temporarily reduces the magnetic coercivity of the disk material, such that its magnetic state can be changed with less magnetic energy, thereby allowing write element 302 to write to more closely spaced regions without spreading magnetic influence beyond the target area. By confining each recorded bit to a smaller area, more data can be packed into the same physical space on the disk, such that higher storage densities can be achieved.

Recording head 318 further comprises write thermal sensor 332 and read thermal sensor 334. In some examples, write thermal sensor 332 is a near-field transducer thermal sensor (NTS) that measures temperature proximate to NFT 316 and write element 302, and read thermal sensor 334 is an embedded contact sensor (ECS) that measures temperature proximate to read element 304. In the following description, while write thermal sensor 332 is often referred to as NTS 332 and read thermal sensor 334 is often referred to as ECS 334, it should be understood that write thermal sensor 332 may comprise thermal sensor types other than an NTS, and read thermal sensor 334 may comprise thermal sensor types other than an ECS. Thermal sensors 332 and 334 are each typically implemented as a resistive temperature detector (RTD), which in some examples is a thin metal film deposited on a substrate that changes its electrical resistance predictably with temperature, allowing precise measurement of thermal changes. The thermal sensor signals can be used to estimate fly height as closer proximity to disk surface 317 increases localized heating, allowing control circuitry 22 to infer changes in head-disk spacing. In addition, and of particular relevance to this disclosure, the thermal sensor signals serve as thermal condition metrics that can be used to predict the likelihood of premature failure of the recording head.

While heating the recording medium (disk surface 317) in data storage devices configured for HAMR enables higher data densities, the intense, localized heating performed by laser unit 320 and NFT 316 can introduce heat-related issues that can impact performance and weaken recording head 318 such that it may fail before reaching its operational lifetime. Early prediction of head failure and taking timely mitigating actions are therefore critical to maintaining the reliability of and extending the lifespan of data storage devices configured for HAMR.

In the following description and claims, the terminology "thermal condition parameter" is intended to cover any parameter, metric, indicator or other measure that is measured or monitored by HDD 15 and that provides information regarding the thermal condition of the recording heads or thermal activity in the recording heads. For example, any parameter that serves as a metric for heat generation, heat accumulation, or heat dissipation may be considered as a thermal condition parameter. In some examples, such thermal condition parameters are monitored on a continuous or periodic basis by HDD 15 and may be recorded, for example, in an E6 log or other diagnostic log of HDD 15. As will be described in more detail below, thermal condition parameters may specifically include some or all of the following parameters: ECS resistance and changes in ECS resistance (dECS); NTS resistance and changes in NTS resistance (dNTS); thermal gradient; write erase width (WeW); and peak media temperature. HDD 15 typically monitors many additional parameters during operation, and some or all of those additional parameters may also be considered thermal condition parameters.

Lifetime testing has shown that thermal condition parameters such as elevated resistances of NTS 332 and ECS 334 (which correlate to elevated temperatures) are indicative of weaker or stressed heads that are prone to earlier failure. Elevated ECS and NTS resistances (temperatures) may be associated with an accumulation of materials, such as debris and lubricant, at the interface of head 318 and media 317 collectively known as "smear". Thus, the operational lifetime of a HAMR head such as recording head 318 is closely correlated with the type and extent of smear that accumulates over time. Excessive smear build-up can increase friction, alter the flying height (FH) of head 318, and degrade the thermal efficiency of and ultimately the operating life of head 318. Smear development and type can be tracked by monitoring thermal condition parameters including the rate of change of the ECS resistance (dECS) and the NTS resistance (dNTS). Additional thermal condition parameters such as changes in fly height (dFH) and changes in the power required to achieve touchdown (dTD) are also useful in tracking smear development.

The formation and behavior of smear are influenced by environmental factors such as relative humidity (RH) and oxygen levels, and operational conditions such as the application (or non-application) of an interface voltage control (IVC) bias voltage. Under high humidity conditions, the dominant smear type has been observed to be silicon dioxide ($SiO_2$). $SiO_2$ smear leads to earlier touchdown events and a reduction in flying height (FH), although a moderate amount of $SiO_2$ buildup can also provide a protective layer for NFT 316. Conversely, low humidity environments tend to promote the formation of smear composed of carbon nitride and/or lubricant material, referred to as CNx/lube smear. CNx/lube smear can cause significant variations in flying height and NFT backheating.

Application of a controlled IVC bias voltage can mitigate the heating effects caused by smear build-up. In particular, application of an IVC bias voltage reduces ECS resistance which in turn reduces the current flowing through ECS 334. Heating caused by current flow is therefore also reduced, which effectively cools ECS 334. Application of an IVC bias voltage also reduces the NTS slope relative to laser current, which reduces backheating of NFT 316.

Figure 4:
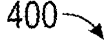
FIG. 4 is a graph illustrating temperature behavior of recording heads configured for HAMR under different RH and IVC conditions, in accordance with aspects of this disclosure.
Figure 4:
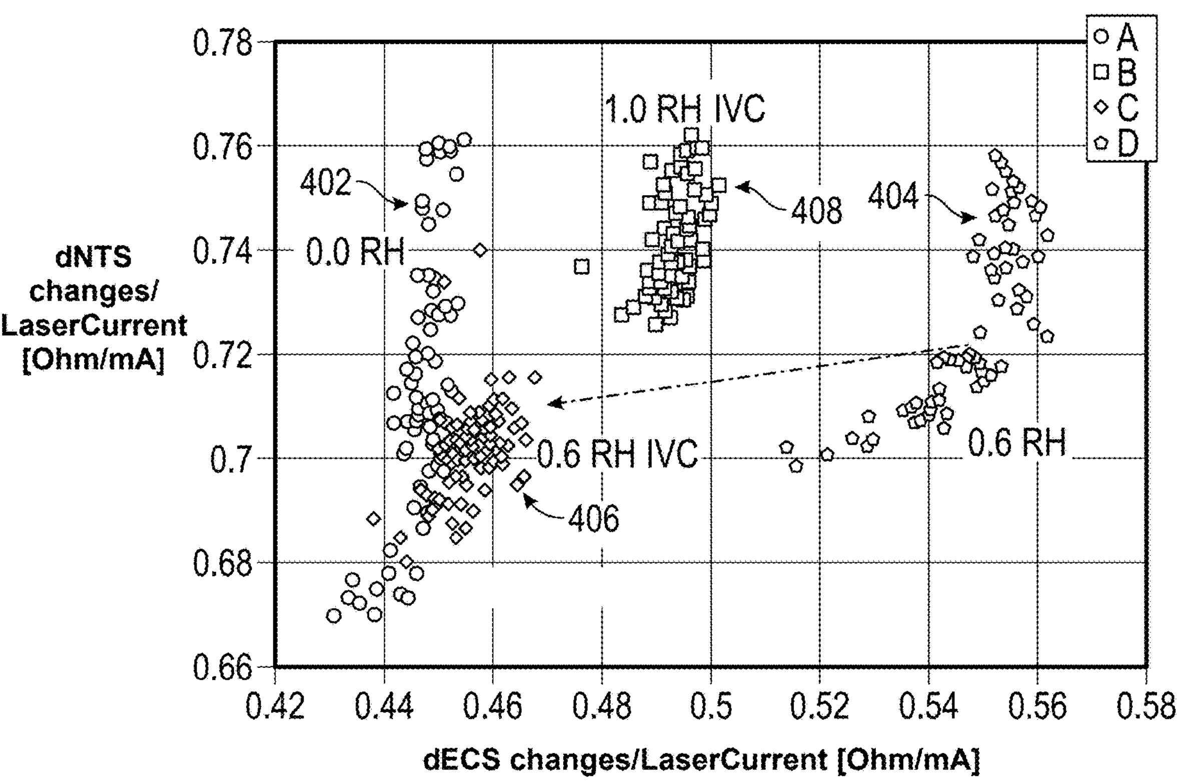

FIG. 4 is a graph 400 illustrating temperature behavior of HAMR heads under different RH and IVC conditions. The ECS and NTS data illustrated in FIG. 4 was measured with laser unit 320 and write element 302 on or operating. By examining ECS resistance change rate (dECS) and NTS resistance change rate (dNTS), temperature behaviors under different RH and IVC bias voltage conditions can be evaluated. In FIG. 4, dECS and dNTS are normalized by the power of laser 320 to ensure that variations in laser power, which can directly influence thermal conditions, are accounted for. Data was collected for approximately 30-50 recording heads in four different trials, with each trial characterized by distinct RH and IVC conditions. As can be seen in FIG. 4, distinct clusters of dECS and dNTS values formed for each trial (i.e., for each distinct RH/IVC combination), demonstrating that the smear types associated with various RH conditions produce specific and repeatable temperature fingerprints that can be influenced by application of IVC bias voltage. In particular, cluster 402 shows dECS and dNTS values at 0.0 normalized RH with no IVC bias voltage applied; cluster 404 shows dECS and dNTS values at 0.6 normalized RH with no IVC bias voltage applied; cluster 406 shows dECS and dNTS values at 0.6 normalized RH with IVC bias voltage applied; and cluster 408 shows dECS and dNTS values at 1.0 normalized RH with IVC bias voltage applied.

Thermal condition parameters such as the dNTS and dECS fingerprints illustrated in FIG. 4 assist in identifying recording heads operating in thermally stressed conditions. Elevated ECS/NTS resistances are often precursors to failure. By establishing these fingerprints as benchmarks and monitoring dECS and dNTS readings, a head exhibiting anomalous behavior such as deviations from expected dECS and dNTS values or predefined thresholds can be flagged as weak and likely to fail before its expected operational lifetime. Armed with this knowledge, corrective actions can be taken to reduce the thermal load on the head and to mitigate against premature failure. One such corrective action is illustrated in FIG. 4: application of an IVC bias voltage. In FIG. 4, the cluster 404 of recording heads 318 operating at 0.6 normalized RH with no IVC bias voltage applied exhibits elevated dECS and dNTS values, reflecting higher thermal stress and increased likelihood of failure. By applying an IVC bias voltage, ECS and NTS resistances are reduced, indicative of a cooling effect that may also reduce NFT temperature, which in turn reduces thermal stress. In particular, it can be seen in FIG. 4 that application of an IVC bias voltage effectively relocates cluster 404 from a region of elevated dECS and dNTS values to a region of lowered dECS and dNTS values (i.e., cluster 406).

In addition to the change rate of ECS and NTS resistance values, absolute ECS and NTS resistance values are also effective to identify outlier heads at risk of premature failure. In some examples, the absolute resistances of NTS 332 and ECS 334 may be measured and monitored across all recording heads 318 in a data storage device, and those heads exhibiting ECS and NTS resistance values that significantly deviate from predefined thresholds can be predicted as likely to fail prematurely (i.e., before its expected operating lifetime). Such outlier heads sometimes result from excessive lapping during manufacturing, which reduces the ECS and NTS stripe height and hence lead to increased ECS and NTS resistance values. They are hence an indication of a weak head. The elevated ECS and NTS values associated with such heads are indicative of thermal stress and increased susceptibility to failure.

Once a head is identified as likely to fail before its expected operational lifetime, corrective actions can be implemented to mitigate the issue and extend the operational lifetime of the head. These corrective actions may include some or all of notification of the host, logical depopulation of the failing head, adjustments to the IVC bias voltage to lower ECS resistance and reduce head temperature, reductions in laser current to decrease thermal stress, reformatting tracks per inch (TPI) and bits per inch (BPI) to adjust recording density, and workload reduction on weaker heads.

Method 80 of FIG. 2C is provided for predicting and mitigating recording head in view of the above. In step 82, control circuitry 22 monitors thermal condition parameters of a recording head 318. In some examples, the thermal condition parameters that are monitored comprise absolute resistances of ECS 334 and NTS 334 and/or change rates of the ECS and NTS resistances (dECS and dNTS). In step 84, control circuitry 22 analyzes the monitored thermal condition parameters to identify conditions indicating a likelihood of failure of the recording head. For example, control circuitry 22 may compare some or all of the ECS, NTS, dECS, and dNTS readings to predefined thresholds to detect deviations indicating that head 318 is likely to fail before reaching its expected operational lifetime. In step 86, corrective actions are taken to mitigate the predicted premature failure, such as adjusting the IVC bias voltage, reducing the workload being handled by the head, and other actions discussed above to reduce the thermal stress on the head.

Another approach for predicting and mitigating head failures applies a machine learning model to improve the accuracy and reliability of failure prediction, providing earlier opportunities to mitigate head failures and extend the lifetime of weak heads. In addition to the ECS and NTS resistances discussed above, the machine learning model is trained on multiple additional thermal condition parameters that are monitored and measured recurrently during in-field operation of the data storage device. In some examples, these thermal condition parameters serve as inputs to a graph neural network (GNN) machine learning model, which analyzes the input thermal condition parameters to identify complex patterns and relationships between the multiple parameters. The GNN model predicts the time-to-failure (TFF) for the recording heads, and improves its accuracy over time through training on multiple machine learning test (MLT) runs for various head and media combinations. As more data is analyzed, the model demonstrates increasing accuracy in predicting TTF and identifying heads likely to fail.

Thermal condition parameters that may be used to train the machine learning model, in addition to NTS and ECS resistances and the change rate (delta) of those resistances may include (without limitation): thermal gradient, write erase width (WeW), and peak media temperature. Thermal gradient is a measure of the spatial rate of temperature change across the recording media near the heated region generated by the HAMR laser, where a shallower thermal gradient may cause heat to spread over a larger area and increase thermal stress on the head. Write erase width (WeW) is related to thermal gradient and is the width of the area on the recording media where data is written or erased, where a narrower WeW may correlate to higher thermal stress. Peak media temperature is the maximum temperature reached on the recording media during the write process, where higher peak media temperatures can increase back-heating of the recording head.

Figure 5:
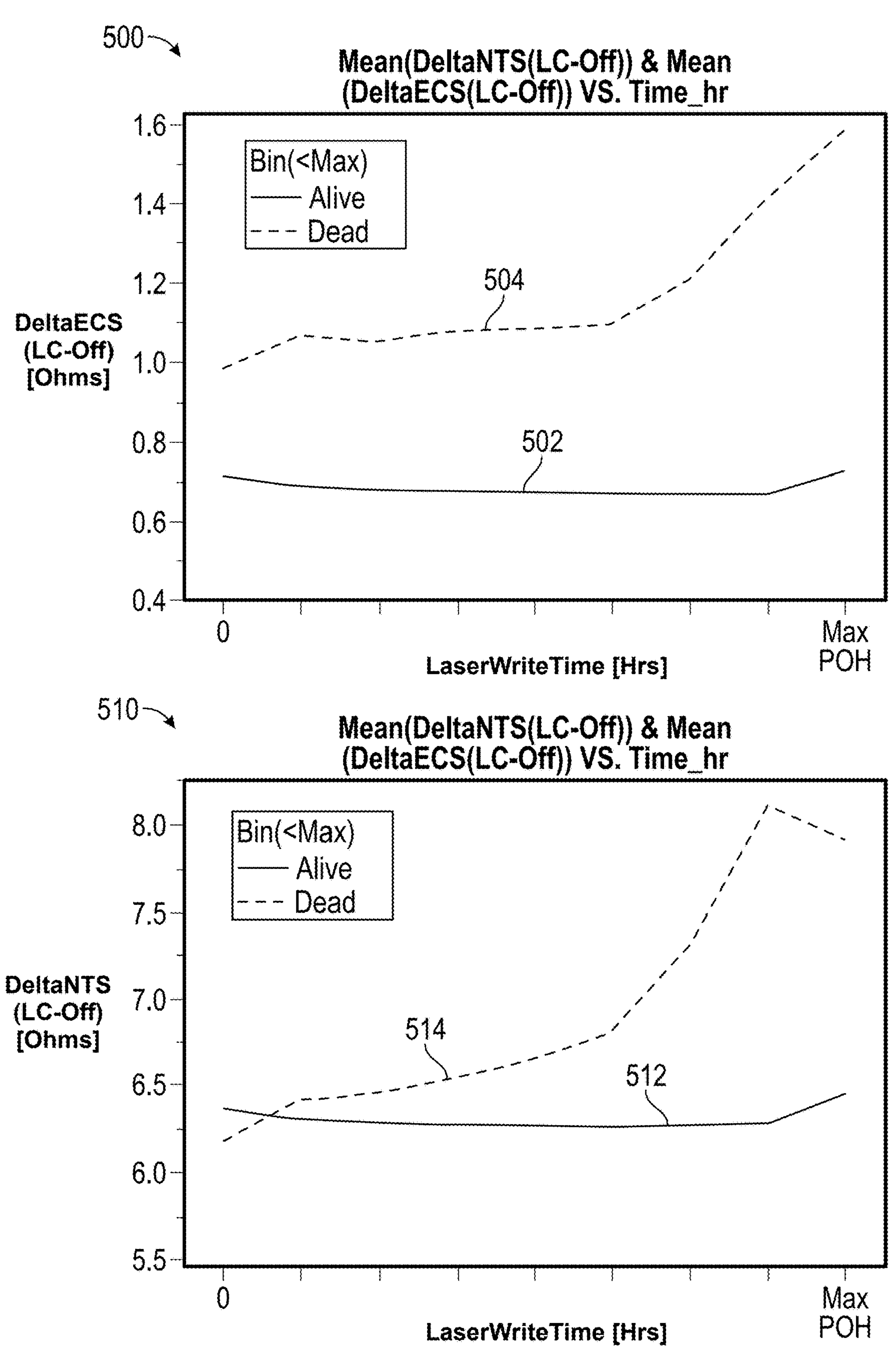
FIG. 5 is a graph showing change rates of ECS and NTS resistances versus operating time in hours, for good heads and weak heads, in accordance with aspects of this disclosure.

FIG. 5 provides an example of parameters that serve as inputs to the machine learning model for predicting recording head failures. In particular, FIG. 5 presents graphs 500 and 510 showing change rates of ECS and NTS resistances versus operating time in hours, for good heads and weak heads, in accordance with aspects of this disclosure. FIG. 5 shows that certain thermal condition parameters that are monitored by the HDD and used to train the machine learning model, in this case, dECS and dNTS, operate as early predictors of recording head failure. The dECS and dNTS parameters shown in FIG. 5 are part of a broader set of thermal condition parameters that may be analyzed by the machine learning model to detect subtle patterns and trends that are early predictors of failure.

Plot 502 of graph 500 plots dECS versus operating time in hours for heads that remain functional over time ("alive" heads), and plot 504 plots dECS versus operating time in hours for heads prone to failure ("dead" heads). A clear separation can be seen between alive heads 502 and dead heads 504 even at the start of operation (0 hours). Failing heads 504 exhibit higher initial dECS values compared to functional heads 502, indicating that these heads will experience elevated thermal stress under laser current conditions from the very start of operation. As operating time increases, dECS values for failing heads 504 steadily rise, diverging further from the stable values seen for functional heads 502. This progression highlights the sensitivity of dECS to early-stage degradation, as heads with higher initial dECS values are predisposed to failure.

Plot 512 of graph 510 plots dNTS versus operating time in hours for heads that remain functional over time ("alive" heads), and plot 514 plots dNTS versus operating time in hours for heads prone to failure ("dead" heads). As can be seen, dNTS values similarly increase more significantly over time for failing heads 514 compared to functional heads 512. While the initial separation is less pronounced than for dECS, the divergence grows as operating hours accumulate.

FIG. 5 is just one example of the trends and patterns that may emerge in the broader set of thermal operating parameters that are analyzed by the machine learning model. Other thermal operating parameters serving as inputs to the machine learning model, such as (without limitation) the absolute values of the NTS and ECS resistances, thermal gradient, write erase width (WeW), and peak media temperature, will likewise reveal patterns and trends that can be identified by the machine learning model and serve as early predictors of recording head failure.

Method 80 of FIG. 2C is also applicable to the machine learning model approach for predicting and mitigating recording head failure. Control circuitry 22 as broadly defined encompasses the HDD firmware in which the machine learning model, or a reduced version of the machine learning model, may be implemented. In step 82, the machine learning model monitors and is trained on multiple thermal condition parameters of a recording head 318. In addition to the ECS- and NTS-related resistance parameters previously described, thermal condition parameters including (without limitation) thermal gradient, write erase width (WeW), and peak media temperature may also be monitored and used to train the machine learning model. In step 84, control circuitry 22 analyzes the monitored thermal condition parameters using the machine learning model and identifies conditions, such as patterns and trends among the parameters, indicating a likelihood of failure of the recording head. As will be explained in more detail below, the likelihood of failure of a recording head may be expressed as a survivability probability score. In step 86, corrective actions are taken to mitigate the predicted failure. Based on the machine learning model's analysis and generated survival probabilities, control circuitry 22 may implement one or more mitigating actions, such as adjusting the IVC bias voltage, reducing laser current, logical depopulation of the recording head, workload reduction, and adjustment of recording density. For very weak heads, the mitigation action may be replacement of the head with a stronger head. As will also be described below, in some examples, the system continuously streams real-time operational data to update the model's predictions and to refine operational policies to ensure that the mitigation strategies adapt dynamically to evolving operating conditions, such as unexpected temperature fluctuations or vibrations.

To enable reliable HAMR lifetime prediction, two interconnected models are used. The first model, an adversarial graph variational auto-encoder (GVAE), learns the latent interactions between multiple monitored parameters. A GVAE combines graph neural networks (GNNs) with variational auto-encoders (VAEs) to encode graph-structured data into a latent space that captures relationships between features, while adversarial learning ensures the latent space is refined to reduce noise and confounding factors (factors that may appear correlated with failures but are actually caused by an unrelated condition, and thus may skew the model's prediction). This process is further enhanced with subject matter expert (SME) assistance, such as labeling data and identifying parameters known to be relevant, to improve accuracy and to eliminate variables that could obscure meaningful patterns.

The second model, a graph isomorphic model, builds upon these learned parameter interactions by constructing an adjacency matrix (edge indices) for the GNN. A graph isomorphic model analyzes patterns within graph data while preserving the relationship between nodes and their connections, even under transformations. This model incorporates survival statistics to handle both censored data—instances where the component has not yet failed during observation—and uncensored data, where failures have already occurred. By integrating this statistical treatment, the model predicts a lifetime expectation value, representing the anticipated operational lifetime of the recording head based on the analyzed parameter interactions. At any point in time, the model may generate a prediction for the expected survival time across various time horizons, such as survival of 24 hours with probability x, 7 days with probability y, and so on. The calculated time horizons may include 24 hours, 7 days, 30 days, 90 days, 180 days, or any other time period. Additionally, the generative nature of this model allows it to predict interventions or adjustments to operating conditions that address the underlying causes reflected in specific features (nodes) within the network. In other words, the model identifies conditions that could lead to failure—such as elevated ECS or NTS resistances or abnormal thermal behaviors—and proposes mitigating actions, such as reducing laser power, logical depopulation, workload reduction, or adjusting other operating parameters to slow degradation, prevent failure, and extend the operational lifetime of weak recording heads.

The machine learning models are designed to be efficient and compact to minimize computational overhead. In some examples, the design may be split into two separate blocks to optimize runtime performance and allow for two deployment scenarios. The first scenario is to deploy the machine learning models during manufacturing or final testing to identify potentially exposed early lifetime failure heads, i.e., defective recording heads that may fail very early in their expected operational lifetime. In some examples, such heads may simply be replaced with properly functioning heads before the data storage device is placed in the field. In addition, the model may identify lifetime limited heads that have a reduced operational lifetime but little risk of immediate failure upon deployment. For such heads, configuration adjustments (mitigation actions) can be made to reduce the stress on the head and allow it to perform reliably for a longer period. Such corrective actions may include logical depopulation of the failing head, adjustments to the IVC bias voltage, reductions in laser current to decrease thermal stress, reformatting tracks per inch (TPI) and bits per inch (BPI) to adjust recording density, and workload reduction on weaker heads. By carefully channeling components with varying lifetimes across different devices, the overall lifetime of each device can be balanced and the scenario of one device having multiple weak components can be avoided.

In some examples, in this first scenario, the machine learning model may be trained offline using historical datasets. The trained model is then simplified into a reduced form and uploaded to HDD firmware residing in control circuitry 22. During drive operation, the firmware uses the reduced model to analyze E6 log data-diagnostic logs generated by HDD firmware that capture real-time parametric data during drive operation—and compute failure predictions for each recording head. Alternatively, the host system may collect the full parametric data from the drive via the E6 logs and apply it to the trained machine learning models to predict the heads at risk of failure.

The second scenario is to integrate the models into the device firmware as part of a real-time lifetime management solution deployed in the field. In this case, real-time operational data is streamed and compared to model predictions. This streaming approach allows for continuous optimization of operating parameters and deployment strategy on an interface and device level, such as selecting the ideal laser current to balance lifetime expectations with soft error rate (SER) or latency, as a function of observed workload, temperature, and other conditions. Additionally, the system can assist with dynamic head depopulation and device re-optimization strategies. The model uses the continuous stream of data to update and refine these predictions in accuracy, using a Bayesian learning approach implemented as actor-critic reinforcement learning (RL). Key to this approach is that operational policies are updated in parallel with the lifetime prediction to maximize the probability of extending the operational life of the components.

Failure prediction and mitigation capabilities are enhanced by incorporating a streaming model with optimization policy capability enabled by reinforcement learning. The initial machine learning model is improved and updated "on the fly" with real time operational data, allowing the system to adapt to new failure modes that may arise during operation. Such new failure modes may be caused, for example, by operating conditions such as temperature fluctuations and operational vibrations that did not occur in the MLT environment where the original model was trained. This capability allows the system to adjust predictions and mitigation strategies based on newly observed conditions, ensuring that the model remains accurate and effective over time.

As part of this process, the system may create survivability probability scores for various time horizons, such as (without limitation) one day, one week, one month, or one year. If the survival probability score exceeds a predetermined threshold—for instance, if the survival probability score indicates a greater than 90% probability of failure within one week—a notification is sent to the host system, the host may be notified. Corrective actions, such as logical depopulation of failing heads, adjustments to the IVC bias voltage to lower ECS resistance and reduce head temperature, reductions in laser current to decrease thermal stress, reformatting tracks per inch (TPI) and bits per inch (BPI) to adjust recording density, and workload reduction on weak heads, can then be implemented to mitigate the issue and extend the operational lifetime of the head.

Figure 6:
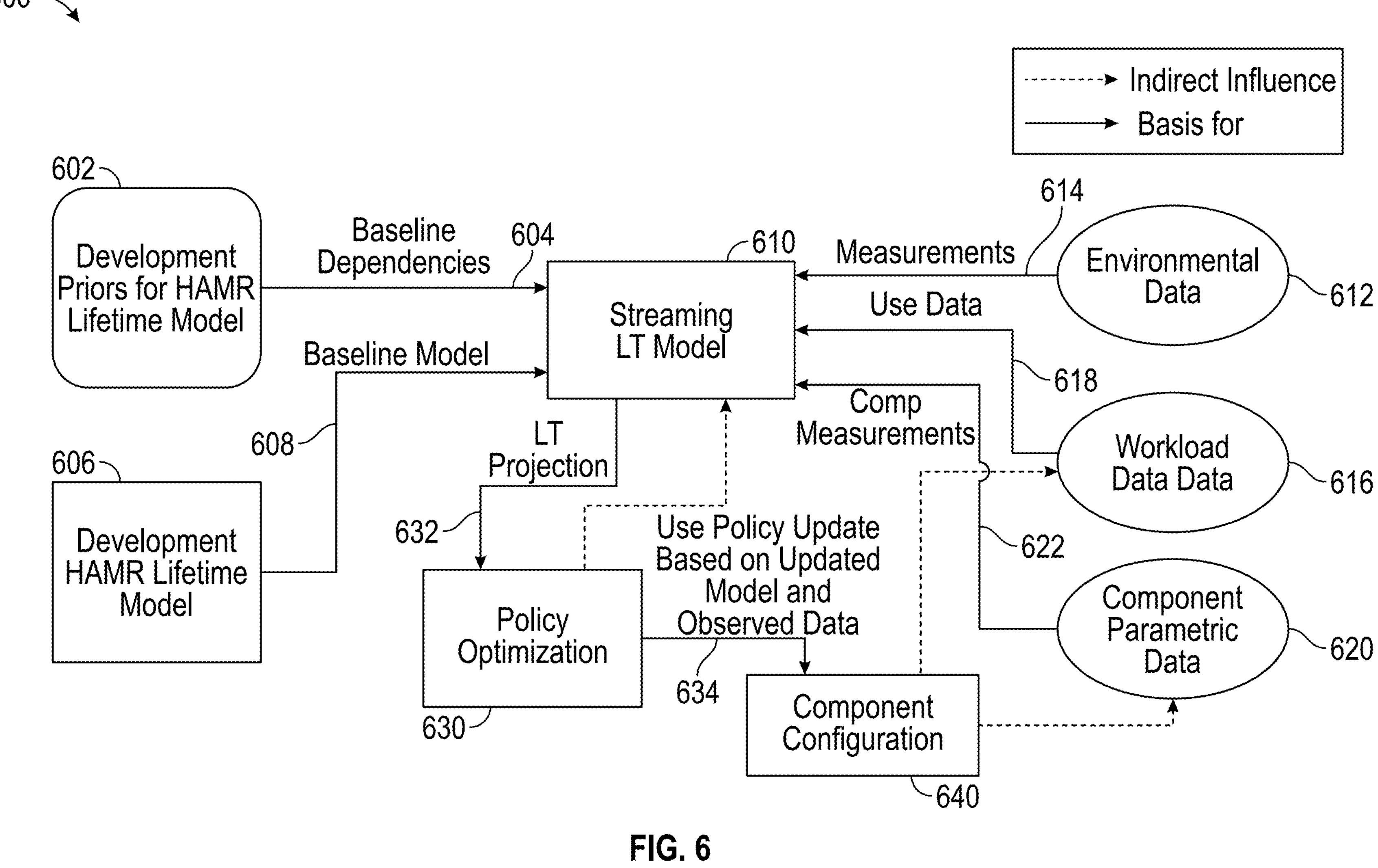
FIG. 6 is a block diagram illustrating the components and data flow of a HAMR lifetime prediction model, in accordance with aspects of this disclosure.

FIG. 6 is a block diagram illustrating the components and data flow of a HAMR lifetime prediction model 600, in accordance with aspects of this disclosure. Lifetime prediction model 600 incorporates real time data and baseline model dependencies and uses streaming lifetime (LT) model 610, which is capable of dynamically updating predictions and operational policies (policy optimization) 630 based on continuously observed component parametric data 620, workload data 616, and environmental data 612.

During the development phase, historical tendencies or "priors" 602 (i.e., previously observed patterns and dependencies between thermal condition parameters used to train the machine model and head operational lifetime) provide baseline dependencies 604, which are used by machine learning model 606 to form a baseline model 608. Baseline model 608 serves as a reference for predicting head failure and lifetime trends under nominal operation, and forms the foundation of streaming LT model 610.

During real-time operation, streaming LT model 610 ingests live measurements and input from multiple data sources, including component parametric data 620 and measurements 622; workload data 616 and use data 618; and environmental data 612 and measurements 614. Component parametric data 620 may include recurrently monitored thermal condition parameters such as ECS and NTS resistance measurements and deltas, thermal gradients, write erase width (WeW), and peak media temperature. Workload data 616 and use data 618 may reflect operational stresses and usage patterns of the recording heads. Environmental data 612 accounts for external influences, such as temperature, vibrations, and other environmental conditions during operation. Streaming LT model 610 continuously compares the observed data to the baseline model, dynamically updating lifetime projections and survival probabilities based on deviations between real-time behavior and the initial predictions.

Model 600 also includes policy optimization component 630 which uses the updated lifetime predictions to recommend or implement operational adjustments to reduce stress on weaker heads and extend their operational lifetime. These adjustments may include changes to component configuration 640 (i.e., reduction of laser current, head depopulation, workload reduction, adjustment of IVC bias voltage, etc.) and other optimization strategies. The optimization policies are influenced not only by direct measurements but also by indirect factors observed through real-time data streams. Policy optimization component 630 dynamically updates optimization policies and component configuration in parallel with the lifetime predictions.

The methods and flow diagrams disclosed herein are implemented by control circuitry 22, which may be implemented partially or wholly in one or more processing devices such as a PLSI, an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform, individually and/or collectively, some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A method for predicting and mitigating recording head failure in a data storage device configured for heat-assisted magnetic recording (HAMR), the method comprising:

monitoring thermal condition parameters of one or more recording heads, wherein the thermal condition parameters include one or more of absolute embedded contact sensor (ECS) resistance, absolute near field temperature sensor (NTS) resistance, change rate of ECS resistance (dECS), and change rate of NTS resistance (dNTS);

comparing the monitored thermal condition parameters to predefined thresholds to detect deviations indicating a likelihood of failure of the one or more recording heads; and implementing one or more corrective actions to reduce thermal stress on the one or more recording heads and to mitigate the likelihood of failure of the one or more recording heads.

2. The method of claim 1, wherein the one or more corrective actions comprises applying an interface voltage control (IVC) bias voltage to the one or more recording heads.

3. The method of claim 2, wherein the IVC bias voltage is in a range of −50 millivolts (mV) to −900 mV.

4. The method of claim 1, wherein the one or more corrective actions comprises reducing a workload applied to the one or more recording heads.

5. The method of claim 1, wherein the one or more corrective actions comprises logical depopulation of the one or more recording heads.

6. A data storage device configured for heat-assisted magnetic recording (HAMR) comprising:

a magnetic storage medium;

one or more recording heads configured to write data to and read data from the magnetic storage medium; and one or more processing devices or components, configured individually or in combination, to predict and mitigate recording head failure by:

monitoring multiple thermal condition parameters of the one or more recording heads during operation;

analyzing the thermal condition parameters using a machine learning model;

generating survival probability scores for the one or more recording heads; and implementing one or more corrective actions based on the generated survival probability scores to mitigate a likelihood of failure and extend an operational lifetime of the one or more recording heads.

7. The data storage device of claim 6, wherein the thermal condition parameters comprise one or more of absolute embedded contact sensor (ECS) resistance, absolute near field temperature sensor (NTS) resistance, change rate of ECS resistance (dECS), change rate of NTS resistance (dNTS), thermal gradient, write erase width (WeW), and peak media temperature.

8. The data storage device of claim 6, wherein the machine learning model is a graph neural network (GNN) model.

9. The data storage device of claim 8, wherein the machine learning model further comprises:

an adversarial graph variational auto-encoder (GVAE) configured to identify latent interactions between the monitored thermal condition parameters; and a graph isomorphic model configured to predict lifetime expectation values for the one or more recording heads based on the latent interactions and survival statistics.

10. The data storage device of claim 6, wherein the one or more processing devices or components is further configured to predict and mitigate recording head failure by streaming real-time operational data to the machine learning model to update the machine learning model's predictions and to refine operational policies to ensure that the one or more corrective actions adapt dynamically to evolving operating conditions.

11. The data storage device of claim 10, wherein the evolving operating conditions comprise temperature fluctuations and operational vibrations.

12. The data storage device of claim 6, wherein the machine learning model is deployed during manufacturing or final testing to identify early lifetime failure heads and lifetime limited heads.

13. The data storage device of claim 6, wherein the one or more corrective actions comprise head replacement, logical depopulation of a failing head, adjustments to an interface voltage control (IVC) bias voltage, reductions in laser current to decrease thermal stress, reformatting tracks per inch (TPI) and bits per inch (BPI) to adjust recording density, and workload reduction.

14. The data storage device of claim 6, wherein the one or more processing devices or components is further configured to predict and mitigate recording head failure by:

training the machine learning model offline using historical datasets; and simplifying the trained machine learning model into a reduced form and uploading the reduced form model to firmware of the data storage device.

15. The data storage device of claim 6, wherein the machine learning model configured to analyze diagnostic logs generated by HDD firmware to capture real-time thermal condition parameters.

16. The data storage device of claim 10, wherein the machine learning model is configured to use a Bayesian learning approach implemented as actor-critic reinforcement learning.

17. The data storage device of claim 6, wherein the survival probability scores are generated for multiple time horizons.

18. The data storage device of claim 10, wherein the machine learning model is configured to ingest data from multiple sources during real-time operation, the multiple sources comprising component parametric data, workload data, and environmental data.

19. The data storage device of claim 10, wherein the machine learning model comprises a policy optimization component that recommends or implements operational adjustments to reduce stress on weaker heads and extend their operational lifetime.

20. A method for predicting and mitigating recording head failure in a data storage device, the method comprising:

monitoring thermal condition parameters of one or more recording heads during operation;

analyzing the thermal condition parameters to identify conditions indicating a likelihood of failure of the one or more recording heads, wherein the analyzing is performed by at least one of:

a simple model that compares the thermal condition parameters to predefined thresholds; and a machine learning model trained to predict time-to-failure of the one or more recording heads based on the thermal condition parameters; and implementing one or more corrective actions to mitigate the likelihood of failure and extend an operational lifetime of the one or more recording heads.

* * * * *